United States Patent Office 3,269,798
Patented August 30, 1966

3,269,798
STABILIZED PHOSPHORIC ACID
John Miles Preston, Box 292, Gilman, Ill.
No Drawing. Original application Jan. 26, 1962, Ser. No. 169,126. Divided and this application Aug. 20, 1964, Ser. No. 397,057
7 Claims. (Cl. 23—165)

This is a division of application Serial No. 169,126, filed January 26, 1962, and now U.S. Patent No. 3,183,073.

This invention relates to an improved liquid fertilizer composition and to a method for preparing such fertilizer compositions.

Liquid fertilizers of a concentrated nature have been produced heretofore but difficulty has been experienced in their "salting out" particularly at low temperatures, say, below the freezing point of water. For example, a fertilizer composition having an analysis of 0–26–26 (percent by weight of N, $P_2O_5$, $K_2O$), although a highly concentrated plant food, will salt out at room temperature. Any precipitation of solids in the liquid will clog the spraying nozzles which are used to apply the fertilizer to the land, or the drain openings in holding tanks. If the solids are permitted to settle to the bottom so that only the supernatant liquid is used, there is no clogging problem but the concentration of the plant food is substantially reduced as compared with the original composition.

In accordance with the present invention, this salting out, or settling of solid materials from the liquid, can be reduced so that the composition is relatively stable at temperatures even below freezing. If the fertilizer is intended to be used at normal temperatures, say above 50° F., the concentration can be proportionately increased as compared with liquid fertilizer compositions proposed heretofore. By increasing the concentration more plant food is present in any given volume of the liquid fertilizer. Hence, in accordance with this invention liquid fertilizer solutions can be prepared in which the salts remain in suspension or solution at much higher concentrations than heretofore possible without settling out. In concentrated form the fertilizer occupies one-third the volume of a conventional composition. The savings in transportation and storage are at once apparent. The farmer using such fertilizer makes fewer trips over the field, thus minimizing damage to plant life or the soil structure.

This improved stability may be obtained by adding to the composition a small quantity of glucose or a sugar or other carbohydrate which hydrolizes to form glucose. Although the ultimate composition is highly alkaline, it has been found desirable to add the sugar or glucose-producing material to the acid prior to admixture with the alkaline portion of the fertilizer composition. I have found that sucrose, maltose and lactose, all disaccharides, are suitable stabilizing additives. As indicated glucose, a monosaccharide, is operable; but I have found that fructose, a monosaccharide, of a slightly different molecular structure, is not operable, at least in comparable concentrations. In preparing the compositions of the invention from high grade furnace phosphoric acid and potassium hydroxide, colloidal or microcrystalline particles may be present in the liquid but remain suspended due to the presence of the stabilizing agent so that it remains a free-flowing solution or suspension of uniform concentration.

In the preferred process of the invention, a small quantity of a sugar, from 0.2% to 7% by weight, is added to phosphoric acid having a $P_2O_5$ content in excess of about 30%. For all operable sugars except lactose, the desired maximum is about 2%. The phosphoric acid containing the sugar is then heated to about 350° F. at atmospheric pressure for a sufficient length of time to increase the $P_2O_5$ content to more than 75%. The concentration of the acid, containing the stabilizing agent, can be increased to as high as 80% before the acid will crystallize out. Then the concentrated acid is admixed with potassium hydroxide solution to produce a solution or suspension of salt in the resulting alkaline liquid. This reaction is exothermic and should be carried out in a jacketed vessel so that heat can be conducted away from the reaction mass to prevent the temperature from exceeding 180° F. This temperature is critical since I have found that if it is exceeded the sugar stabilizer loses its ability to function as a stabilizing agent for the composition. The sugar will dehydrate to carbon in alkaline solution.

The sugar stabilizers of the invention have also been found to be particularly suitable for use with green acid fertilizers. Green phosphoric acid, sometimes called wet process phosphoric acid, is obtained by treating phosphate rock with sulfuric acid and separating the insoluble calcium sulfate formed. This acid is less expensive but is highly impure and contains many salts, metals and suspended organic matter. When green acid is combined with potash, ammonia, urea or other nitrogen-bearing material to produce a fertilizer composition, the impurities form a gelatinous precipitate. Consequently, fertilizers made with green acid are especially troublesome from the standpoint of settling out. The precipitation also changes the concentration of the fertilizer composition (as in the high analysis fertilizer) and presents problems in storage or in application of the fertilizer.

The addition of a sugar in accordance with the invention markedly decreases the tendencies of these impurities to settle out, thereby greatly improving the handling qualities of the fertilizer.

It will be appreciated that the improvement of the invention is achieved at relatively low cost. It is not necessary to use pure sugar, but beet steep liquor, a by-product of sugar refining which contains sugars, is entirely suitable. Any unrefined liquors or residues containing the aforementioned operable additives are also applicable for use in this invention.

The following specific examples will illustrate the process which is utilized to prepare fertilizers in accordance with the invention, and will also illustrate some modifications in compositions of the invention. Except for those steps which are indicated to be critical, these examples are not intended to limit this invention but are set forth merely for purposes of illustration.

*Example 1*

Phosphoric acid having concentration of 54% $P_2O_5$ was treated by adding 2% sucrose in a minimum amount of water. The mixture had a specific gravity of 1.3. The solution was then heated to 350° F. to increase the concentration to 76% $P_2O_5$. This highly concentrated phosphoric acid with the sugar added may be used as a master batch of superacid in preparing specific fertilizer compositions.

To make a fertilizer corresponding to an analysis of 0–35–35 (percent by weight of N, $P_2O_5$, $K_2O$), 921 grams of the concentrated superacid were admixed with 845 grams of potassium hydroxide in 234 grams of water to form 2,000 grams of the liquid composition. These proportions were used in mixing laboratory batches but if the amounts are taken in pounds rather than grams, the composition will total one ton of fertilizer. The mixing of the acid and the alkali is carried out in a jacketed vessel through which cooling water is passed to maintain the temperature below 180° F. This fertilizer, although highly concentrated, is remarkably stable and does not salt out until a temperature of less than −20° F. has been reached. Consequently, it may be sprayed during the normal fertilizing season in any climate without troublesome salting out.

Preparations using maltose or lactose in place of sucrose in this example have shown identical properties as to salting out temperatures.

Example II

The superacid prepared in accordance with Example I and containing 2% sucrose was admixed with ammonium hydroxide (29.4% $NH_3$) in the proportions of 632 grams of acid to 664 grams $NH_4OH$. 704 grams of water were added to bring the total to 2,000 grams. The resultant liquid fertilizer had an analysis of 8–24–0, and was found to remain in the liquid phase at temperatures as low as 7° F.

Example III

A liquid fertilizer having an analysis of 5–20–20 can be produced by admixing ammonia and potassium hydroxide with the superphosphoric acid prepared in accordance with Example I. These ingredients are added in the following proportions:

| | Grams |
|---|---|
| $NH_3$ | 121.2 |
| KOH | 500 |
| $H_3PO_4$ (80%) | 500 |
| $H_2O$ | 880 |

The resultant liquid fertilizer was stable at temperatures down to −20° F.

Nitric acid containing 20% nitrogen may be substituted for the ammonia as a source of nitrogen without raising the salting out temperature. Urea may also be substituted for the ammonia but will raise the salting out temperature somewhat.

It will be appreciated that it is impossible to approach the formulation set forth in the examples using normal 54% phosphoric acid.

Example IV

Green phosphoric acid (75% $P_2O_5$) containing 2% glucose was admixed with ammonium hydroxide in the correct proportions to produce a liquid fertilizer having an analysis of 10–30–0. To 1200 grams of this composition were added 200 grams of KCl and 600 grams of water. The resulting composition had an analysis of 6–18–6. Such compositions without the added glucose contain a gelatinous precipitate. The resulting fertilizer had a salting out temperature considerably lower than 6–18–6 fertilizer produced by conventional methods.

Acids containing from 30 to 54% $P_2O_5$ are also useful in formulating high analysis fertilizer. From 0.5 to 2% by weight of glucose may be added to such phosphoric acids and concentrated by heating to increase the $P_2O_5$ content to 75–80%. To this concentrated acid is added KOH or $NH_4OH$ with cooling and agitation to produce the desired formulae.

Example V

Green phosphoric acid having a $P_2O_5$ content of 54.5% was concentrated to 80% $P_2O_5$ by heating, after 2% by weight of glucose was added. 881 grams of this concentrated acid was added to 664 grams of $NH_4OH$ (29.4% $NH_3$) to produce a stable liquid fertilizer having an 8–24–0 formulation.

Example VI

Green phosphoric acid (30% $P_2O_5$) was concentrated to 77% $P_2O_5$ by heating after 2% by weight of maltose was added. 211 grams of this concentrated acid was added to 664 grams of $NH_4OH$ (29.4% $NH_3$) to produce an 8–24–0 formulation characterized by exceptional stability with respect to salting out.

I claim:

1. As a composition of matter, a concentrated phosphoric acid solution of minimally 76% $P_2O_5$ in admixture with, as a low temperature stabilizing agent, 0.05% to 7% by weight of said acid of a sugar selected from the group consisting of sucrose, lactose, maltose and glucose.

2. As a composition of matter, a concentrated phosphoric acid solution of minimally 76% $P_2O_5$ in admixture with, as a low temperature stabilizing agent, a sugar selected from the group consisting of sucrose, lactose, maltose and glucose.

3. As a composition of matter, a concentrated phosphoric acid solution in admixture with, as a low temperature stabilizing agent, 0.05% to 7% by weight of said acid of a sugar selected from the group consisting of sucrose, lactose, maltose and glucose.

4. As a composition of matter, a concentrated phosphoric acid solution of minimally 76% $P_2O_5$ having admixed therewith as a low temperature stabilizing agent a beet steep liquor.

5. Composition of claim 1 wherein said phosphoric acid is wet process phosphoric acid.

6. Composition of claim 2 wherein said phosphoric acid is wet process phosphoric acid.

7. Composition of claim 3 wherein said phosphoric acid is wet process phosphoric acid.

References Cited by the Examiner

UNITED STATES PATENTS

| 1,768,007 | 6/1930 | Sigmund. | |
| 1,950,068 | 3/1934 | Spangenberg | 71—11 XR |
| 1,950,701 | 3/1934 | Spangenberg | 71—11 XR |
| 2,770,540 | 11/1956 | Vierling | 71—1 XR |
| 2,869,998 | 1/1959 | Vierling | 71—1 XR |
| 2,929,700 | 3/1960 | Bennett | 71—25 XR |
| 3,015,552 | 1/1962 | Striplin et al. | 71—1 XR |
| 3,074,927 | 1/1963 | Soltman et al. | 71—1 XR |

OTHER REFERENCES

Mehltrelter et al. "Sequestration by Sugar Acids," Ind. & Eng. Chem., vol. 45, No. 12, Dec. 1953, pp. 2782–84.

OSCAR R. VERTIZ, *Primary Examiner.*

MAURICE A. BRINDISI, *Examiner.*

O. F. CRUTCHFIELD, *Assistant Examiner.*